United States Patent
Mattson

Patent Number: 5,512,742
Date of Patent: Apr. 30, 1996

[54] SOLAR ENERGY AND TRACKING SYSTEM

[76] Inventor: Brad A. Mattson, 1805 Dogwood, North Las Vegas, Nev. 89030

[21] Appl. No.: 174,677

[22] Filed: Dec. 28, 1993

[51] Int. Cl.$^6$ ........................................ F24J 2/38
[52] U.S. Cl. ...................... 250/203.4; 126/578; 126/573
[58] Field of Search ................ 60/641.15; 250/203.4; 126/573, 578, 604, 605, 600

[56] References Cited

U.S. PATENT DOCUMENTS

| | | | |
|---|---|---|---|
| 3,305,686 | 2/1967 | Carter et al. | 250/203 |
| 3,613,659 | 10/1968 | Philips | 126/605 |
| 3,996,917 | 12/1976 | Trihey | 126/270 |
| 3,999,389 | 12/1976 | Bryce | 126/600 |
| 4,082,947 | 4/1978 | Haywood et al. | 126/270 |
| 4,179,612 | 12/1979 | Smith | 126/425 |
| 4,225,781 | 9/1980 | Hammons | 126/425 |
| 4,242,580 | 12/1980 | Kaplow et al. | 136/246 |
| 4,275,712 | 6/1981 | Baer | 126/425 |
| 4,314,546 | 2/1982 | Miller | 126/425 |
| 4,316,084 | 2/1982 | Stout | 126/425 |
| 4,367,403 | 1/1983 | Miller | 356/141 |
| 4,424,801 | 1/1984 | Mori | 126/425 |
| 4,424,802 | 1/1984 | Winders | 250/203.4 |
| 4,495,408 | 1/1985 | Mori | 126/425 |
| 4,556,788 | 12/1985 | Hanak | 126/425 |
| 4,687,923 | 8/1987 | Bauck | 126/425 |
| 4,769,531 | 9/1988 | Malek | 126/425 |
| 5,317,145 | 5/1994 | Corio | 250/203.4 |

OTHER PUBLICATIONS

John Ericsson, solar hot–air engine, 1872.
Abel Pifre, solar–powered printing press, 1880.
John Ericsson, sun motor, 1884.
Aubrey Eneas, sun motor, 1901.
Hydrogen Engineering, solar–dish generating system Barstow, California., tower & hydrogen engine dish.

*Primary Examiner*—Ira S. Lazarus
*Assistant Examiner*—Leonard Heyman

[57] ABSTRACT

A 180 degree×90 degree solar tracking system using two sensors for tracking the sun from sunrise to sunset. A parabolic collector rigidly plumbed to a steam engine which drives an electric generator mounted on the latitude lever. The 180 degree×90 degree movement support is a group of pipes and levers that is powered by household water pressure via three hydraulic rams.

3 Claims, 6 Drawing Sheets

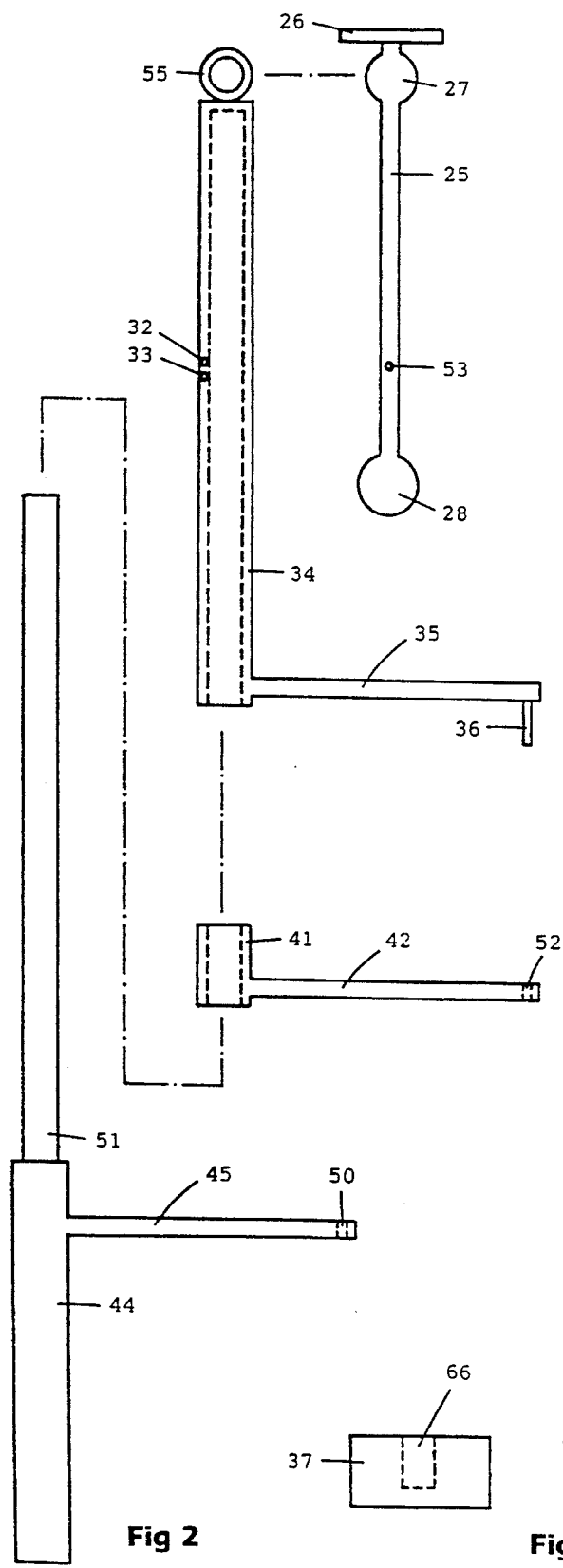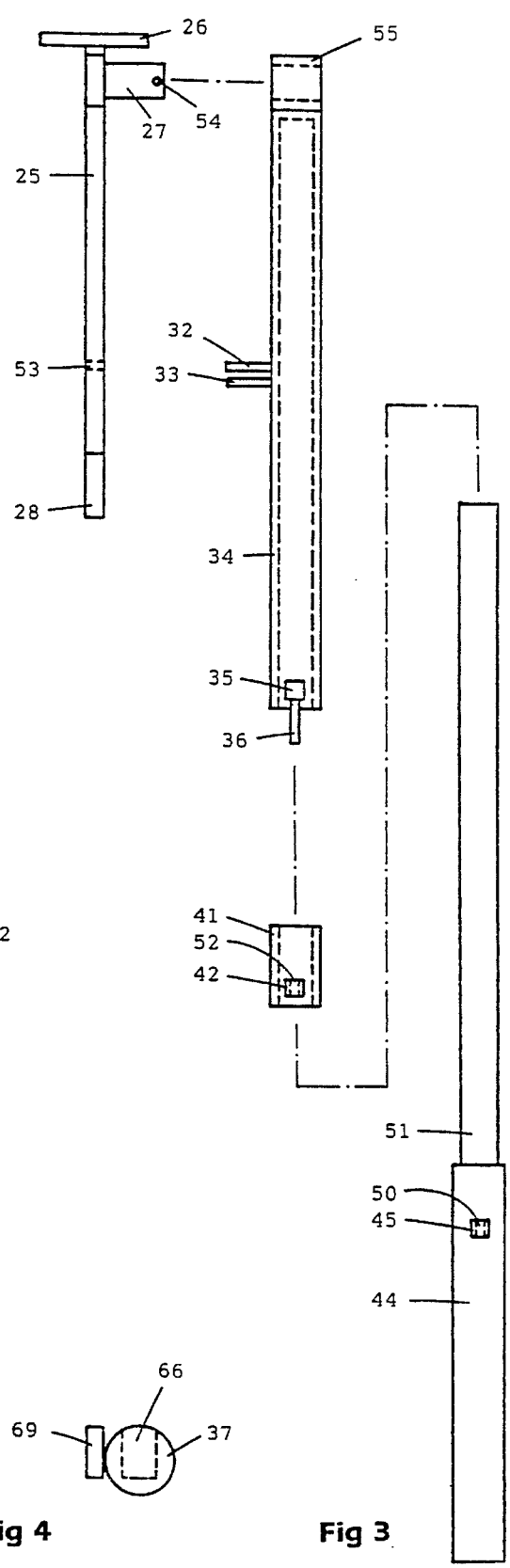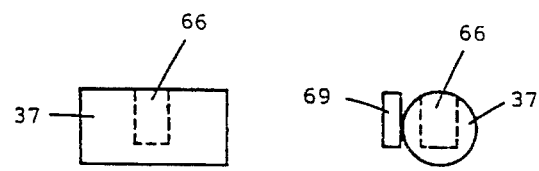

SOLAR ENERGY AND TRACKING SYSTEM

BACKGROUND—FIELD OF INVENTION

This invention relates to a solar energy and tracking system specifically designed to track the sun automatically.

BACKGROUND—DESCRIPTION OF PRIOR ART

Solar energy tracking systems previously have been engineered in many different ways. They used everything from clocks through rooms of computers to follow the sun.

The patent search I received included U.S. Pat. No. 3,305,686 to Carter (1967); U.S. Pat. No. 3,996,917 to Trihey (1976); U.S. Pat. No. 4,082,947 to Haywood (1978); U.S. Pat. No. 4,179,612 to Smith (1979); U.S. Pat. No. 4,225,781 to Hammons (1980); U.S. Pat. No. 4,242,580 to Kaplow (1980); U.S. Pat. No. 4,275,712 to Baer (1981); U.S. Pat. No. 4,314,546 to Miller (1982); U.S. Pat. No. 4,316,084 to Stout (1982); U.S. Pat. No. 4,367,403 to Miller (1983); U.S. Pat. No. 4,424,801 to Mori (1984); U.S. Pat. No. 4,495,408 to Mori (1985); U.S. Pat. No. 4,556,788 to Hanak (1985); U.S. Pat. No. 4,687,923 to Bauck (1987); and U.S. Pat. No. 4,769,531 to Malek (1988). Other pertinent devises are by John Ericsson (1872); Abel Pifre (1880); John Ericsson (1884); Audrey Eneas (1901); McDonnell Douglas and Barstow California.

The afore mentioned patents and devices employed many methods, most of which are repeated throughout. The disadvantages of the patents and devices listed are:

(a) The use of motors and gears at the rotation points are expensive to manufacture. To gear low enough at the fulcrum to track the slow movement of the sun accurately they detrimentally require extended periods of time for relocation.

(b) The absence of an eastwardly reset is a blatant inadequacy. The sensors would thereby be shaded, pointing in the opposite direction of the sun and be disoriented in foregoing cycles.

(c) The use of complex microprocessors and voltage comparitors between sensors at different light intensities is unwarranted.

(d) Small collectors restricted to the encompassing movement apparatus are inefficient compared with the cost and operation expense.

(e) The use of outside alternating current or inverters defeats the purpose of solar energy utilization.

(f) Locating the engine at the focal point requires technically advanced parts to cope with exceedingly high temperatures, this location also requires a complex parabolic mirror that is prodigiously expensive to manufacture.

(g) Locating the engine away from the collector requires pivoting seals or flexible hoses that are costly and will deteriorate from exposure to extreme variant temperatures.

OBJECTS AND ADVANTAGES

Accordingly, besides the objects and advantages of the solar energy tracking systems described in the above patents and devices, several objects and advantages of the present invention are:

(a) to provide hydraulic rams that will be adjusted accurately, quickly, and are dirt-cheap to manufacture and operate;

(b) to provide an eastwardly re-set which will guarantee that the solar energy and tracking system will find the sun every day it appears; thereby fully utilizing the sun's available resources.

(c) to provide a simple electronic control circuit for tracking the sun;

(d) to provide a 180 degree×90 degree movement support to hold a large collector that is very cost efficient;

(e) to provide a self-contained solar energy and tracking system, with the exception of several gallons of pressurized water per day, which is negligible;

(f) to provide a simple collector and a considerably cooler location for the engine which enables the engine and the collector to be constructed from "off-the-shelf" parts;

(g) to provide an engine on the latitude axis which allows the plumbing to be ridged and thus lasting indefinitely.

Further objects and advantages of this system are to provide an incredibly low cost means of delivering alternating current without costly inverters. This system operates without expensive bearings. It is a self-controlled "mini" power station easily installed in the vicinity where power is needed; thereby introducing an alternative to 300 foot towers, ¼ million dollar collectors, and costly transmission lines.

DRAWING FIGURES

FIG. 2 shows a southern exploded view of the 180 degree×90 degree movement support.

FIG. 3 shows an eastern exploded view of the 180 degree×90 degree movement support.

FIG. 4 shows a front view and a side view of a 1st & 2nd ram lever slide respectively from left to fight.

DESCRIPTION—FIGS. 1 to 11

Figure 1:
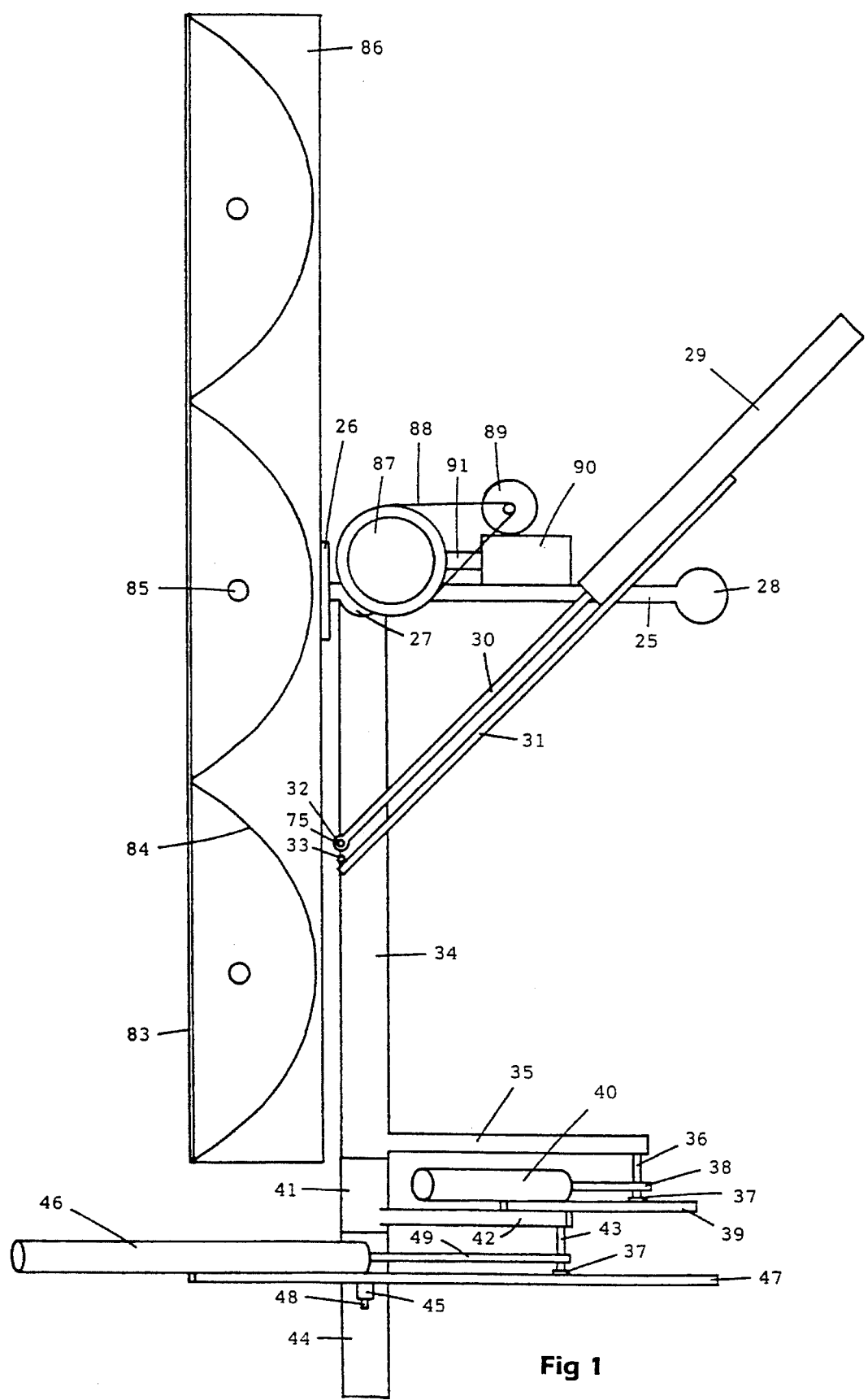
FIG. 1 shows an eastern view of the solar tracking system facing south.

A typical embodiment of the solar energy and tracking system of the present invention is illustrated in FIG. 1, an eastern view with the collector facing south. It's main purpose is to position the collector perpendicular to the sun's (celestial object) radiation and tracking the sun's movement from sunrise to sunset, then repositioning itself to face eastwardly at night. With the collector perpendicular to the sun, the radiation passes through a glass 83 reflects off a set of parabolic minors 84 held in place by a collector frame 86. Then the radiation converges onto a set of focus pipes 85 (focus light absorber) that are filled with water that boils producing steam pressure and is rigidly plumbed (not shown because of simplicity and because of multiple erroneous views) to a steam engine 90. A linear/rotation slide 91 reciprocates, turning a flywheel 87. This drives an electric generator 89 (an accesory) via a belt 88. The collector and the steam engine accumulation are attached to a latitude lever 25 (consequential axis).

The latitude lever 25 provides the 90 degree movement support from horizon to zenith and is comprised of a mounting plate 26, a latitude rotation 27, a counter weight 28, a bolt hole 54, and a 3rd ram pin hole 53 (holes 54 and 53 not shown in this view).

A 3rd linear adjuster 29 provides the movement means for the latitude lever 25 and is comprised of a 3rd ram lever 31, a 3rd ram rod 30, a 3rd ram rod hole 75, and a 3rd ram pin 78 (pin 78 not shown in this view).

A 2nd vertical support 34 (primary axis) provides the 180 degree movement support from east to west and is comprised of a rudder lever 35, a rudder lever pin 36, a 3rd ram lever slide 33, a 3rd ram rod hole pin 32, and a latitude rotation race 55 (race 55 not shown in this view).

A idle lever 42 provides one half of the 180 degree movement support from south to west and is comprised of a idle rotation 41 and a 2nd ram pin hole 52 (hole 52 not shown in this view).

A 2nd linear adjuster 40 provides one half of the 180 degree movement means of the 2nd vertical support 34 from south to west and is comprised of a 2nd ram rod 38, a 2nd ram lever 39, a 2nd ram pin 43, a 2nd ram rod hole 76, and an east stop magnet 74 (hole 76 and magnet 74 not shown in this view).

A 1st vertical support 44 holds the entire solar tracking system and provides the other half of the 180 degree movement support from east to south. The 1st vertical support 44 is permanently set in concrete or mounted to a structure and comprises of a stationary lever 45, a 1st ram pin hole 50, and a 2nd support rotation race 51 (hole 50 and race 51 not shown in this view).

A 1st linear adjuster 46 provides the other half of the 180 degree movement means from east to south and is comprised of a 1st ram rod 49, a 1st ram lever 47, a 1st ram pin 48, a 1st ram rod hole 77, and an east stop magnet 74 (hole 77 and magnet 74 not shown in this view).

FIG. 2 shows a southern exploded view of the 180 degree×90 degree movement support (dual axis movement support means) which is comprised of the 1st vertical support 44, the idle lever 42, the 2nd vertical support 34, and the latitude lever 25. The 1st vertical support 44 is two round steel pipes, one with the outside diameter 1/16" smaller than the inside diameter of the other and slipped together leaving approximately 6' of the smaller pipe exposed. Several holes are drilled through the larger pipe (6" diameter) at random (a common welding practice, not shown) before assembly, with the smaller pipe (5" diameter) inserted; the two are welded together through the holes leaving a smooth perpendicular joint between the two pipes. A 2"×2"×2'9" steel stock is welded perpendicular to the 6" diameter pipe approximately 5" from the intersection of the two pipes. A ½" hole is drilled at the end of the 2"×2"×2'9" stock— parallel to the 2nd support rotation race 51.

The 1st vertical support 44 is mounted—set with the 2nd support rotation race 51 up and plumb; the stationary lever 45 is postioned approximately 2" south of true east. For the idle lever 42 an 8"×6" diameter pipe is dropped over the 2nd support rotation race 51. A 2"×2"× 2'9" stock exactly like the one used for the stationary lever 45 is welded to the idle rotation 41, 6" away from the stationary, lever 45 with the stock and hole parallel. For the 2nd vertical support 34 a 6" diameter pipe the length of the distance between the top of the idle rotation 41 and the top of the 2nd support rotation race 51 minus 1/16" is used. A ½"×6" diameter steel plate is welded to one end of the pipe (sealing it off), then the open end is dropped over the 2nd support rotation race 51. A 2"×2"×2'9" stock exactly like the idle lever 42 is crafted in the same manner except that a ½" diameter×6½" rod is placed in the ½" hole and welded flush with the top of the rudder lever 35. A 6"×6" diameter pipe is welded to the top of the 2nd vertical support 34 with it's center line perpendicular to the 2nd vertical support 34 and the rudder lever 35. The 3rd ram rod hole pin 32 is a ½" diameter×6" steel rod, welded to the 2nd vertical support 34, 2'8" from the center and parallel with the latitude rotation race 55 center line and to the far left side of the 2nd vertical support 34. The 3rd ram lever slide 33 is a steel rod just like that of the 3rd ram rod hole pin 32 welded to the 2nd vertical support 34 directly below the 3rd ram rod hole pin 32, parallel and 2" away. For the latitude lever 25 it is best to look at FIG. 2 and FIG. 3.

FIG. 3 shows an eastern exploded view of the 180 degree×90 degree movement support which is comprised of the 1st vertical support 44, the idle lever 42, the 2nd vertical support 34 (already described in FIG. 2), and the latitude lever 25 ( a latitude movement means). The latitude lever 25 is a 2"×2"×4' steel stock with a 12"×12"×½" steel plate welded perpendicular and centered on the end of the 2"×2"× 4' stock. Then a 5" diameter×7" pipe is welded perpendicular and centered on the latitude lever 25 2" from the mounting plate 26. Then the latitude rotation 27 is slipped through the latitude rotation race 55 and a ½" hole is drilled through the excess sticking out. A ½" bolt and nut (not shown) are affixed to the bolt hole 54, leaving the latitude lever 25 to hang down parallel to the 2nd vertical support 34. A ½" hole is drilled through the latitude lever 25 adjacent and parallel to the 3rd ram rod hole pin 32 producing the 3rd ram pin hole 53. A lead counter weight 28 is affixed to the end of the latitude lever 25, opposite of the mounting plate 26.

FIG. 4 shows a front view and a side view of a 1st & 2nd ram lever slide 37 respectively from left to right. The 1st & 2nd ram lever slide 37 is a 1" diameter×2" steel rod with a ½" hole drilled three quarters of the way through and centered. Then a proximity sensor 69 is epoxied face down, adjacent and parallel to a 1st & 2nd slide pin hole 66.

Figure 5:
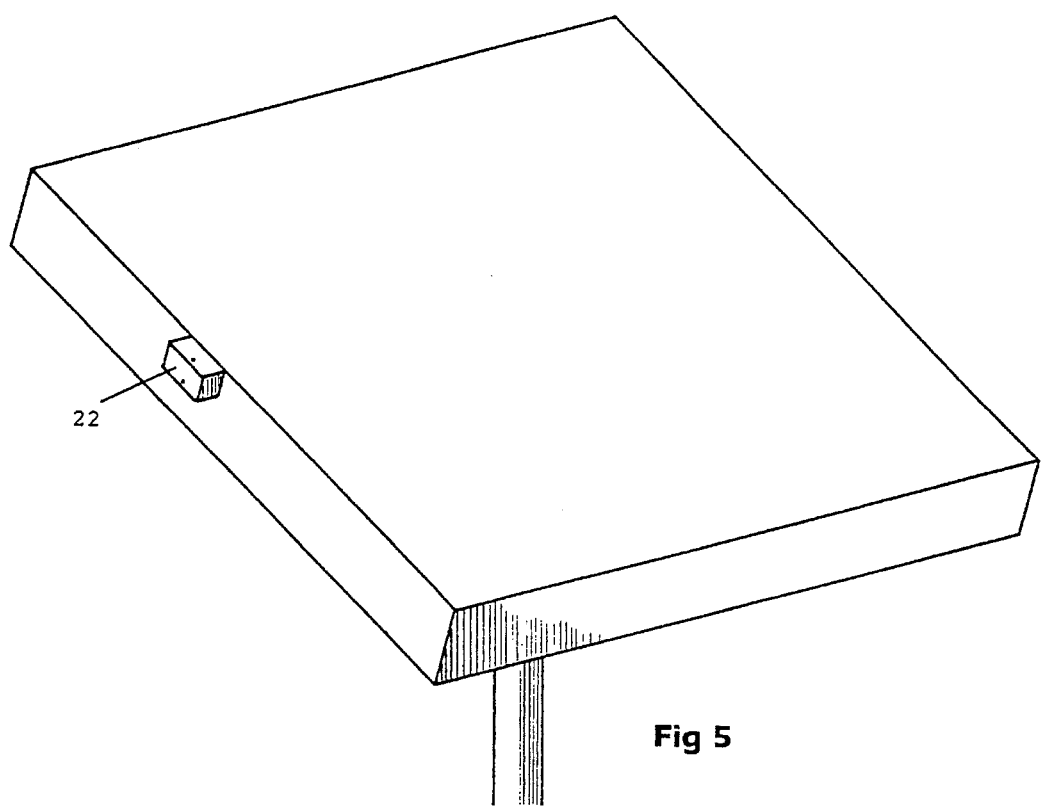
FIG. 5 shows where the dark enclosure is located on a collector.

FIG. 5 shows where a dark enclosure 22 is located on a collector. The dark enclosure 22 is attached to the west side of the collector.

Figure 6:
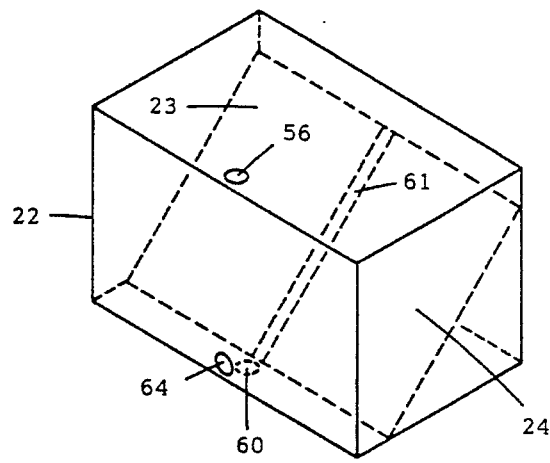
FIG. 6 shows an isometric view of the dark enclosure.

FIG. 6 shows an isometric view of the dark enclosure 22 which is comprised of a 4¼"×¼"×8" box with a 3/16" diameter light opening 56 in the top surface towards the edge and centered. Two 4"×4" solar cells are mounted inside set at a forty-five degree angle. A down/west sensor 23 and a up/west sensor 24 are separated by an opposite sensor tape 61 (which is a ⅛"×4" piece of electrical tape). The sunlight shines through the light opening 56 and with the sensors being dark, the beam of light strikes one or both sensors. The tracker correctly responds, making the beam move towards a target center 60. Thus the tracker is ⅙th of a degree perpendicular to the sun with this particular model. An additional light opening 64 is in the side surface towards the bottom edge and centered; it receives light past approximately 11:00 am and can be added to the dark enclosure 22 for chronic overcast mornings.

Figure 7:
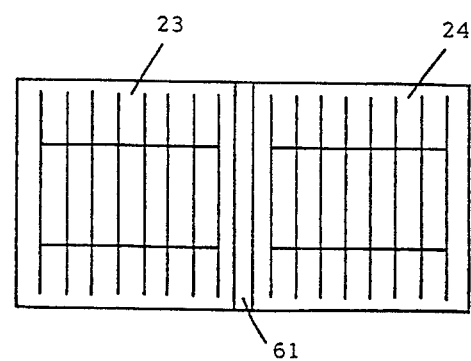
FIG. 7 shows the light sensors.

FIG. 7 shows the light sensors. The down/west sensor 23 and the up/west sensor 24 are 4"×4" solar cells separated by the opposite sensor tape 61 (which is a ⅛"×4" piece of electrical tape).

Figure 8:
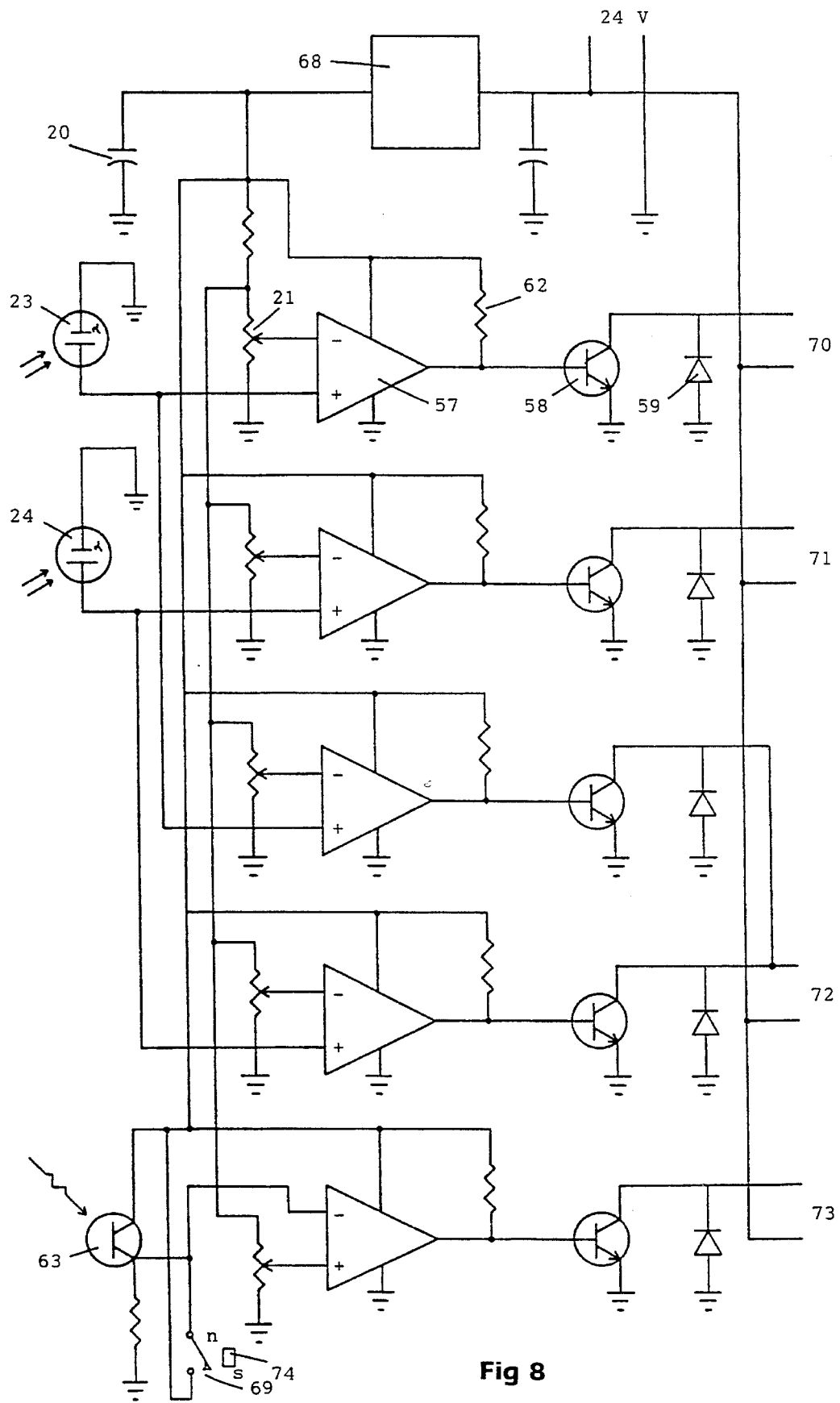
FIG. 8 shows a schematic of the electronics that continues on to FIG. 9.
Figure 9:
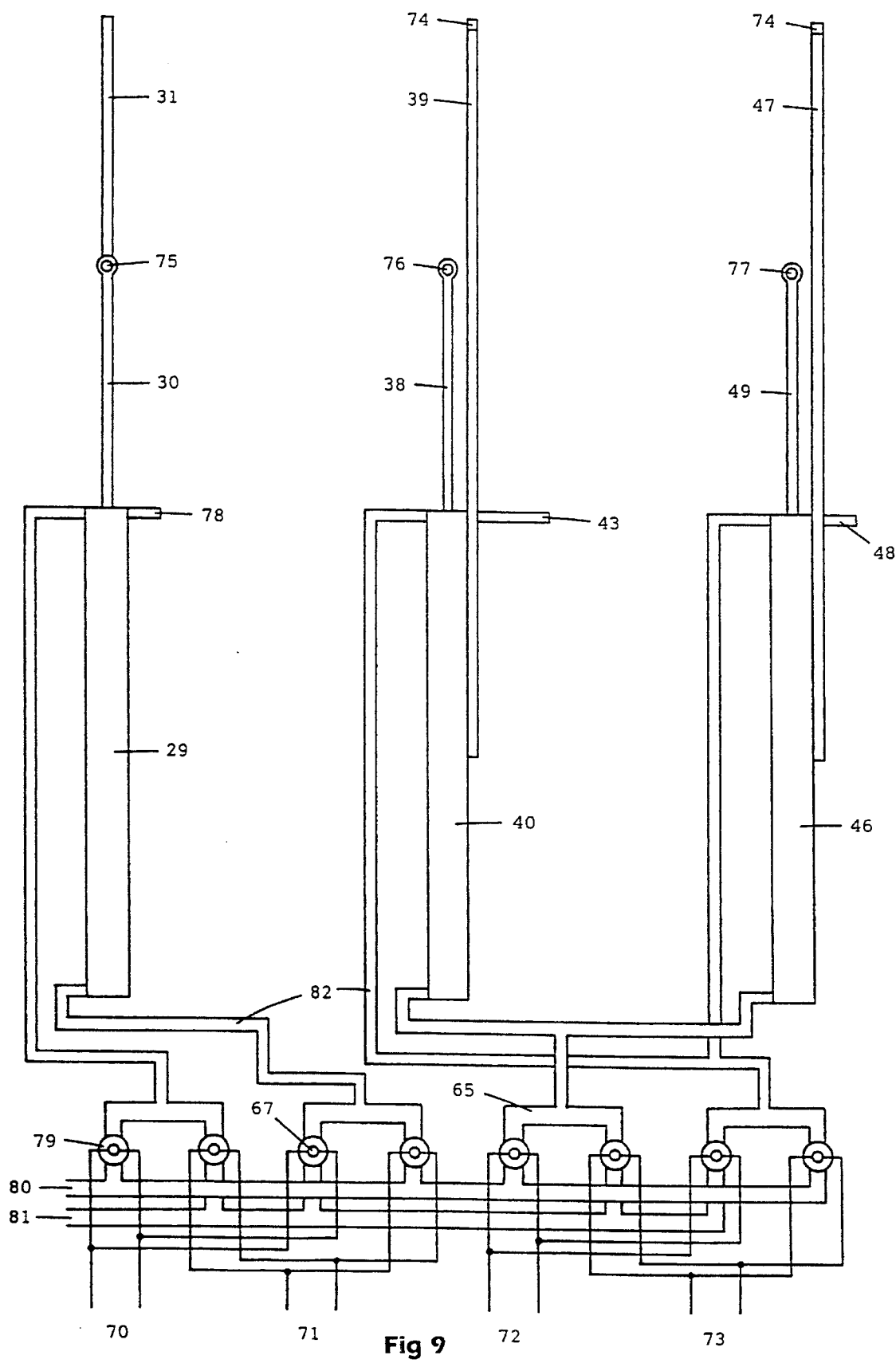
FIG. 9 shows the hydraulic schematic which is a continuation of FIG. 8.

FIG. 8 shows a schematic of the electronics (electronic control means) that continues on to FIG. 9. The 24 volts is received from the electric generator 89 (FIG. 1) and is reduced to 5 volts by a voltage regulator 68. The power supply is de-coupled by a set of capacitors 20. The light sensors 23 and 24 are solar cells. When they are struck by a beam of light they generate a small voltage that is fed to the input of an appropriate voltage comparator 57. When the voltage produced by the solar cell exceeds the reference voltage set by a potentiometer 21, the output is driven positive and forward, biasing a transistor 58. This causes the transistor 58 to conduct allowing current to flow from the power supply through the relay coil, thereby energizing a water sprinkler coil 67 (FIG. 9) via a set of movement leads 70, 71, and 72. A resistor 62 from the power supply scales down the reference from 5 volts to a range appropriate for threshold adjustment by the potentiometer 21. The other resistors 62 are pull-up resistors that provide bias for the switching transistor 58 when the output of the comparitor 57 goes high. A diode 59 supresses high voltage transients generated when the water sprinkler coil 67 is de-energized protecting the switching transistor 58. A photo transistor 63 starts an eastwardly movement via a set of east reset leads 73 when the sun goes down and which continues until the proximity sensors 69 (FIG. 4) reach the east stop magnets 74 (FIG. 9). The photo transistor 63 should not be construed to be a third light sensor for tracking the sun since it may be replaced by a clock driven contactor that will interrupt power to the voltage comparitor 57 for a short amount of time during the night. The down movement leads 70, the up movement leads 71, the west movement leads 72, and the east reset leads 73 are continued on to FIG. 9.

FIG. 9 shows the hydraulic schematic which is a continuation of FIG. 8. The leads 70–73 open or close their corresponding water sprinkler coils 67 letting a water pressure 81 in or a water dump 80 out of the linear adjusters 29, 40, and 46 via a set of PVC pipes 65, a set of water sprinkler valves 79, and a set of rubber hoses 82.

The 3rd linear adjuster 29 is a hydraulic ram with a ½" diameter×3" steel rod welded perpendicular to the end of the 3rd linear adjuster 29 adjacent to the 3rd ram rod 30. The 3rd ram lever 31 is a 1"×1"×6' steel stock welded parrallel to the under side of the 3rd linear adjuster 29 leaving approximately 4' extended parallel to the 3rd ram rod 30. Installation of the 3rd linear adjuster 29 is to insert the 3rd ram pin 78 into the 3rd ram pin hole 53 (FIG. 2 and 3) and the 3rd ram rod hole 75 is then slipped over the 3rd ram rod hole pin 32 (FIG. 1, 2, 3, 10 and 11 ). The 3rd ram lever 31 slides against the 3rd ram lever slide 33 (FIG. 1, 2, and 3); counter balancing the weight of the 3rd linear adjusted 29 filled with water.

The 2nd linear adjuster 40 is basically like the 3rd linear adjuster 29 except the 2nd ram lever 39 has an east stop magnet 74 at the end. The 2nd ram pin 43 is twice as long as the 3rd ram pin 78, and the 2nd ram lever 39 and the 2nd ram pin 43 are welded together. Installation of the 2nd linear adjuster 40 is to insert the 2nd ram pin 43 into the 2nd ram pin hole 52 (FIG. 2 & 3). The 2nd ram rod hole 76 is then slipped over the rudder lever pin 36 (FIG. 1,2, and 3). One of the 1st & 2nd ram lever slides 37 (FIG. 1 and 4) is installed on to the rudder lever pin 36 (FIG. 1,2, and 3) to counter balance the weight of the 2nd linear adjuster 40 filled with water. The 1st linear adjuster 46 is just like the 2nd linear adjuster 40 except the 1st ram pin 48 is half as long as the 2nd ram pin 43. The installation of the 1st linear adjuster 46 is with the 1st ram pin 48 inserted in to the 1st ram pin hole 50 (FIG. 2 and 3). The 1st ram rod hole 77 is then slipped over the 2nd ram pin 43 (FIG. 1). The other 1st & 2nd ram lever slide 37 (FIG. 1 and 4) is installed onto the 2nd ram pin 43 (FIG. 1) to counter balance the weight of the 1st linear adjuster 46 filled with water.

Figure 10:
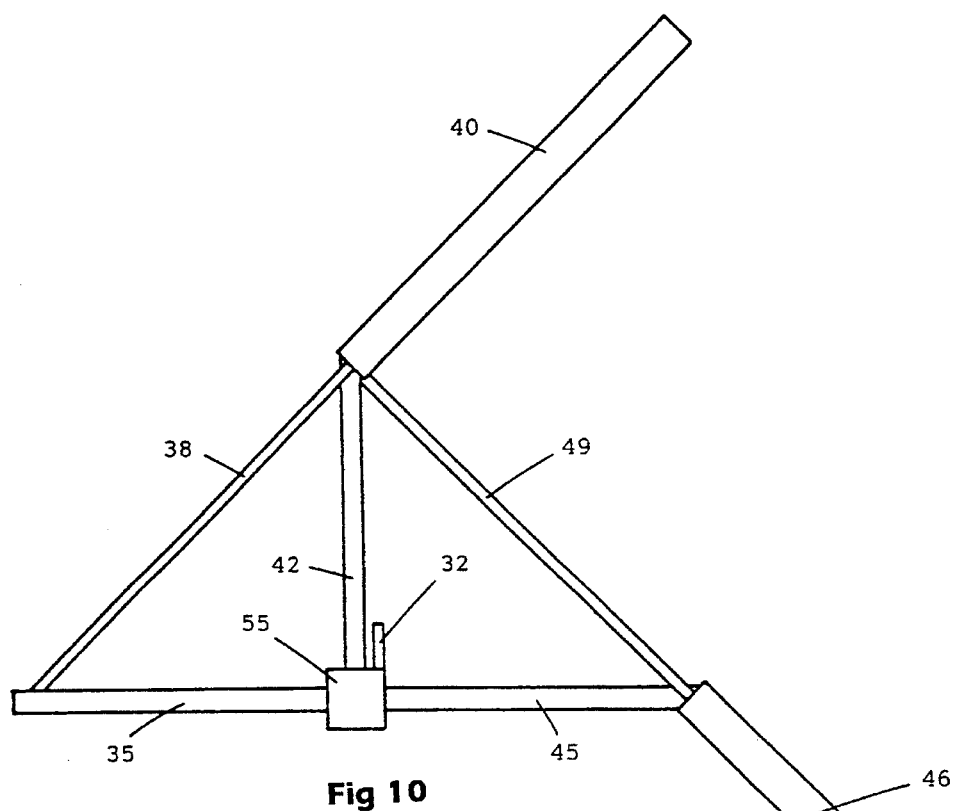
FIG. 10 shows a top view of the 180 degree movement support fully extended.

FIG. 10 shows a top view of the 180 degree movement support fully extended. FIG. 10 is a top view of the solar tracking system with the latitude lever 25 (FIG. 1, 2 and 3 ) and all it's attachments removed, to get a better illustration of the 180 degree movement support. What is visible from this view is the latitude rotation race 55, the 3rd ram rod hole pin 32, the stationary lever 45, the idle lever 42, the rudder lever 35, the 1st linear adjuster 46, the 1st ram rod 49, the 2nd linear adjuster 40, and the 2nd ram rod 38.

Figure 11:
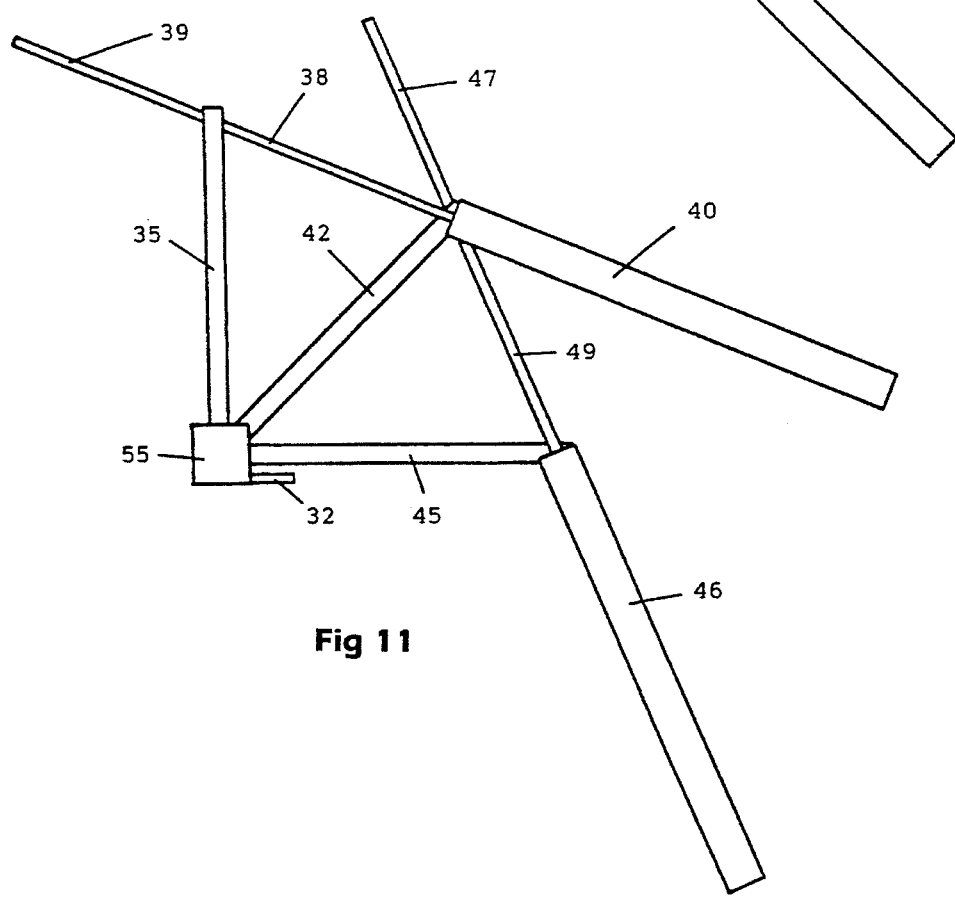
FIG. 11 shows a top view of the 180 degree movement support midway.

FIG. 11 shows a top view of the 180 degree movement support midway; which is the same position as in FIG. 1. FIG. 11 is similar to FIG. 10 in it's purpose of providing better illustration. What is visible from this view is the latitude rotation race 55, the 3rd ram rod hole pin 32, the stationary lever 45, the idle lever 42, the rudder lever 35, the 1st linear adjuster 46, the 1st ram rod 49, the 1st ram lever 47, the 2nd linear adjuster 40, the 2nd ram rod 38, and the 2nd ram lever 39.

SUMMARY, RAMIFICATIONS, AND SCOPE

Accordingly, the reader will see that the solar energy and tracking system of this invention is an incredibly inexpensive and highly efficient source of energy which operates without the need of bearings and has a higher efficiency rate than photo voltaic technology. It delivers alternating current without expensive inverters. It is a power station in itself, located precisely where energy is needed. Furthermore, the solar tracking system has the additional advantages in that

- it provides hydraulic rams that will be adjusted accurately, quickly, and are dirt-cheap to manufacture and operate;
- it provides an eastwardly re-set which will guarantee the solar energy and tracking system will find the sun every day it appears; thereby fully utilizing the sun's available resources.
- it provides a simple electronic control circuit for tracking the sun;
- it provides a 180 degree×90 degree movement support to hold a large collector that is very, cost efficient;
- it provides a self-contained solar energy and tracking system, with the exception of several gallons of pressurized water per day, which is negligible;
- it provides a simple collector and a considerably cooler location for the engine which enables them to be constructed from "off-the-shelf" parts;
- it provides an engine on the latitude axis which allows the plumbing to be ridged and thus lasting indefinitely.

Although the description above contains many specifities, these should not be construed as limiting the scope of the invention but as merely providing illustrations of some of the presently preferred embodiments of this invention. For example, the photo transistor may be replaced by a clock, the hydraulic rams may be replaced by electric screw rams, the engine can pressurize air to power the rams. The engine can also pressurize and recirculate antifreeze for ram actuation making the solar tracker totally self-contained. The electric generator can be used to separate water into hydrogen and oxygen. The engine can pressurize water to be injected into the focus pipes to replenish lost water. The light receiver can be of any shape having more holes, slits, mirrors, and or the inside covered with the two sensors wired parallel. The collector can also be used for heating, absorption-cooling and or distilling. The engine can also pressurize many other things; such as refrigerants, air, etc., or even be utilized as a water pump. Thus, the scope of the invention should be determined by the appended Claims herein and their legal equivalents, rather than by the examples given.

I claim:

1. A solar tracking system that is comprised of a dark enclosure with an opening to let in light associated with a consequential axis having therein two light sensors, each giving two separate directional signals in response to light impinging thereon from said opening, said sensors connected to an electronic control means for directing a dual axis movement support means.

2. A solar tracking system that is comprised of a dark enclosure with an opening to let in light associated with a consequential axis, said enclosure having therein no more than two light sensors, each giving two separate directional signals in response to light impinging thereon from said opening, said sensors connected to an electronic control means for directing a dual axis movement support means.

3. A solar tracking system that is comprised of no more than two solar cells mounted in a dark enclosure permeated by a single beam of sunlight related to a consequential axis, when insolated each of said solar cells produce a voltage which is processed by a electronic voltage comparator circuit which produces control signals causing actuation of the three corresponding tracking directions of a dual axis movement support means.

* * * * *